US012760925B2

(12) United States Patent
Liang et al.

(10) Patent No.: US 12,760,925 B2
(45) Date of Patent: Oct. 13, 2026

(54) DEHUMIDIFIER

(71) Applicant: HISENSE (GUANGDONG) AIR CONDITIONING CO., LTD., Jiangmen (CN)

(72) Inventors: Bingxiang Liang, Jiangmen (CN); Kangsheng Yang, Jiangmen (CN); Zhiwen Liang, Jiangmen (CN)

(73) Assignee: HISENSE (GUANGDONG) AIR CONDITIONING CO., LTD., Jiangmen (CN)

(*) Notice: Subject to any disclaimer, the term of this patent is extended or adjusted under 35 U.S.C. 154(b) by 85 days.

(21) Appl. No.: 18/794,545

(22) Filed: Aug. 5, 2024

(65) Prior Publication Data

US 2024/0393007 A1 Nov. 28, 2024

Related U.S. Application Data

(63) Continuation of application No. PCT/CN2023/089336, filed on Apr. 19, 2023.

(30) Foreign Application Priority Data

Apr. 19, 2022 (CN) ........................ 202220911928.5
Aug. 31, 2022 (CN) ........................ 202222327426.0
(Continued)

(51) Int. Cl.
*F24F 13/22* (2006.01)
*B01D 53/26* (2006.01)
*F24F 1/0358* (2019.01)

(52) U.S. Cl.
CPC .......... *F24F 13/222* (2013.01); *B01D 53/265* (2013.01); *F24F 1/0358* (2019.02);
(Continued)

(58) Field of Classification Search
CPC .. F24F 13/222; F24F 1/0358; F24F 2013/227; B01D 553/265; B01D 2257/80; B01D 2258/06
See application file for complete search history.

(56) References Cited

U.S. PATENT DOCUMENTS

2017/0036515 A1 2/2017 Ko
2019/0226775 A1 7/2019 Lorang et al.
(Continued)

FOREIGN PATENT DOCUMENTS

CN 109798647 A 5/2019
CN 209857325 U 12/2019
(Continued)

OTHER PUBLICATIONS

CN-212805849-U translation.*
(Continued)

*Primary Examiner* — Elizabeth J Martin
(74) *Attorney, Agent, or Firm* — MH2 Technology Law Group LLP

(57) ABSTRACT

A dehumidifier is provided. The dehumidifier includes a housing, a machine body, a drainage pipe, and a sealing plug assembly. The housing includes a back plate and a drainage hole. The back plate includes an inner surface and an outer surface. The drainage hole is located in the back plate. The drainage pipe includes an extending portion, and the extending portion extends along a direction of the inner surface of the back plate towards the outer surface. The sealing plug assembly includes a sealing plug body, and the sealing plug assembly is configured to seal the drainage hole. The sealing plug body is detachably connected to the extending portion. The sealing plug body includes a first cavity. The first cavity is located at a side of the sealing plug body proximate to the
(Continued)

machine body. At least a portion of the extending portion is sealingly connected to the first cavity.

19 Claims, 11 Drawing Sheets

(30) Foreign Application Priority Data

Aug. 31, 2022 (CN) ......................... 202222330864.2
Sep. 5, 2022 (CN) ......................... 202222360874.0

(52) U.S. Cl.
CPC ...... *B01D 2257/80* (2013.01); *B01D 2258/06* (2013.01); *F24F 2013/227* (2013.01)

(56) References Cited

U.S. PATENT DOCUMENTS

2020/0056794 A1 2/2020 Lorang
2023/0194106 A1* 6/2023 Leezer ..................... F24F 11/86
236/44 A

FOREIGN PATENT DOCUMENTS

| | | | |
|---|---|---|---|
| CN | 212805849 U | * | 3/2021 |
| CN | 217082760 U | | 7/2022 |
| CN | 217900068 U | | 11/2022 |
| CN | 217900168 U | | 11/2022 |

OTHER PUBLICATIONS

International Search Report and Written Opinion mailed Jun. 22, 2023 in corresponding International Application No. PCT/CN2023/089335, translated, 14 pages.
International Search Report and Written Opinion mailed Aug. 2, 2023 in corresponding International Application No. PCT/CN2023/089336, translated, 14 pages.

* cited by examiner

DEHUMIDIFIER

CROSS-REFERENCE TO RELATED APPLICATIONS

This application is a continuation application of International Patent Application No. PCT/CN2023/089336, filed on Apr. 19, 2023, which claims priority to Chinese Patent Application No. 202220911928.5, filed on Apr. 19, 2022, Chinese Patent Application No. 202222330864.2, filed on Aug. 31, 2022, Chinese Patent Application No. 202222327426.0, filed on Aug. 31, 2022, and Chinese Patent Application No. 202222360874.0, filed on Sep. 5, 2022, which are incorporated herein by reference in their entireties.

TECHNICAL FIELD

The present disclosure relates to the field of air conditioning technologies, and in particular, to a dehumidifier.

BACKGROUND

A dehumidifier draws humid air into a machine body, then exchanges heat through a heat exchanger to condense the moisture in the air into condensed water. The treated dry air is then discharged out of the machine body. This cycle reduces indoor humidity.

SUMMARY

A dehumidifier is provided, and the dehumidifier includes a machine body, a housing, a drainage pipe and a sealing plug assembly. The machine body is located in the housing, and the housing includes a back plate and a drainage hole. The back plate includes an inner surface and an outer surface. The inner surface is a surface of the back plate proximate to an interior of the machine body, and the outer surface is a surface of the back plate away from the interior of the machine body. The drainage hole is located in the back plate and extends through the back plate along a thickness direction of the back plate. The drainage pipe is located in the housing. An end of the drainage pipe is communicated with the drainage hole. The drainage pipe includes an extending portion, and the extending portion extends along a direction of the inner surface of the back plate towards the outer surface. The sealing plug assembly includes a sealing plug body. The sealing plug assembly is configured to seal the drainage hole in a case where the dehumidifier does not require drainage. The sealing plug body is detachably connected to the extending portion. The sealing plug body includes a first annular structure, a second annular structure and a first cavity. The first annular structure and the second annular structure are spaced apart along a radial direction of the sealing plug body. The first cavity is defined between the first annular structure and the second annular structure. The first cavity is located at a side of the sealing plug body proximate to the machine body, and at least a portion of the extending portion is sealingly connected to the first cavity.

DETAILED DESCRIPTION

Figure 1:
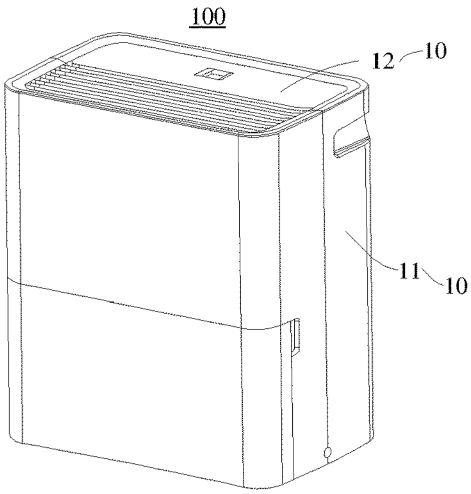
FIG. 1 is a structural diagram of a dehumidifier, in accordance with some embodiments.

Some embodiments of the present disclosure will be described clearly and completely with reference to the accompanying drawings. However, the described embodiments are merely some but not all of embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying a relative importance or implicitly indicating a number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled," "connected," and derivatives thereof may be used. The term "connected" should be understood in a broad sense. For example, the term "connected" may represent a fixed connection, a detachable connection, or a one-piece connection, or may represent a direct connection, or may represent an indirect connection through an intermediate medium. The term "coupled" indicates that two or more components are in direct physical or electrical contact with each other. The term "coupled" or "communicatively coupled" may also mean that two or more components are not in direct contact with each other but still cooperate or interact with each other. The embodiments disclosed herein are not necessarily limited to the content herein.

The phrase "A and/or B" includes the following three combinations: only A, only B, and a combination of A and B.

The use of the phrase "applicable to" or "configured to" herein means an open and inclusive expression, which does not exclude devices that are applicable to or configured to perform additional tasks or steps.

In additional, the phase "based on" used herein is meant to be open and inclusive, in that a process, step, calculation, or other action "based on" one or more stated conditions or values may, in practice, be based on additional conditions or values beyond those stated.

Figure 2:
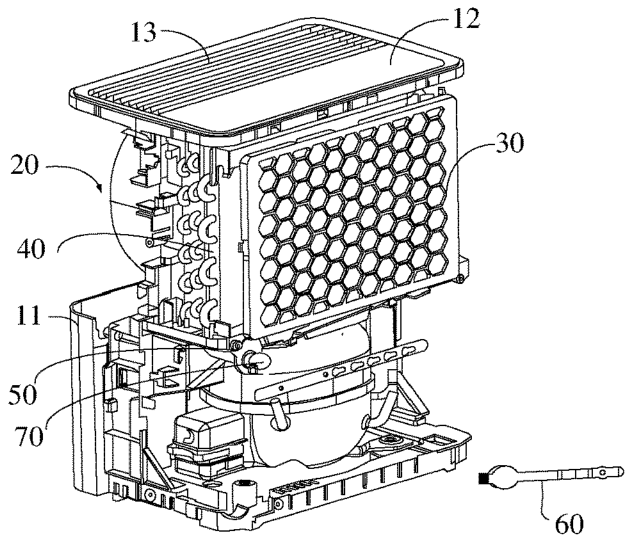
FIG. 2 is a structural diagram of a dehumidifier without a housing, in accordance with some embodiments.
Figure 3:
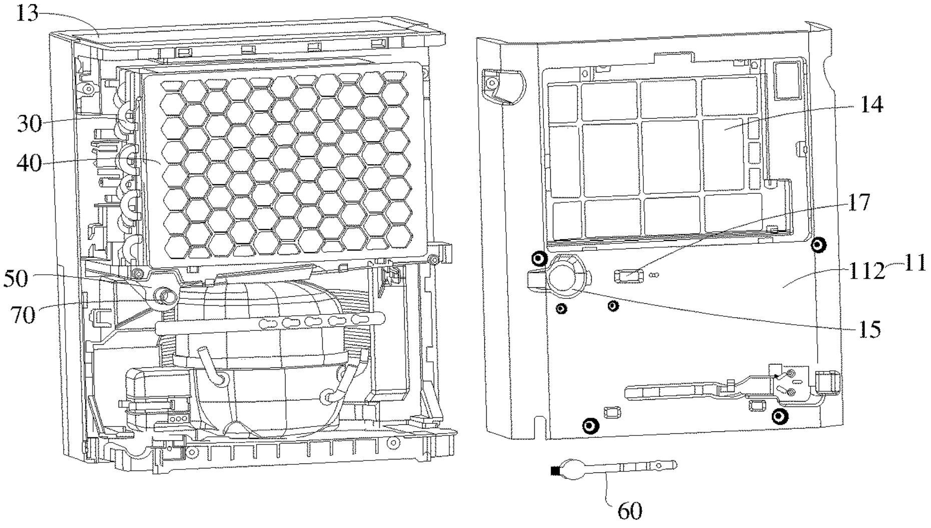
FIG. 3 is an exploded view of a dehumidifier, in accordance with some embodiments.

As shown in FIGS. 1 to 3, a dehumidifier 100 includes a housing 10, a machine body 20, a fan assembly 30, a heat exchanger 40, a water collecting pan 50, a sealing plug assembly 60 and a drainage pipe 70. The housing 10 includes a back plate 11, a top plate 12, an air outlet 13, an air inlet 14 and a drainage hole 15. The air outlet 13 is located on the top plate 12 of the housing 10, the air inlet 14 is located in the back plate 11 of the housing 10, and the drainage hole 15 extends through the back plate 11 along a thickness direction of the back plate 11.

Figure 4:
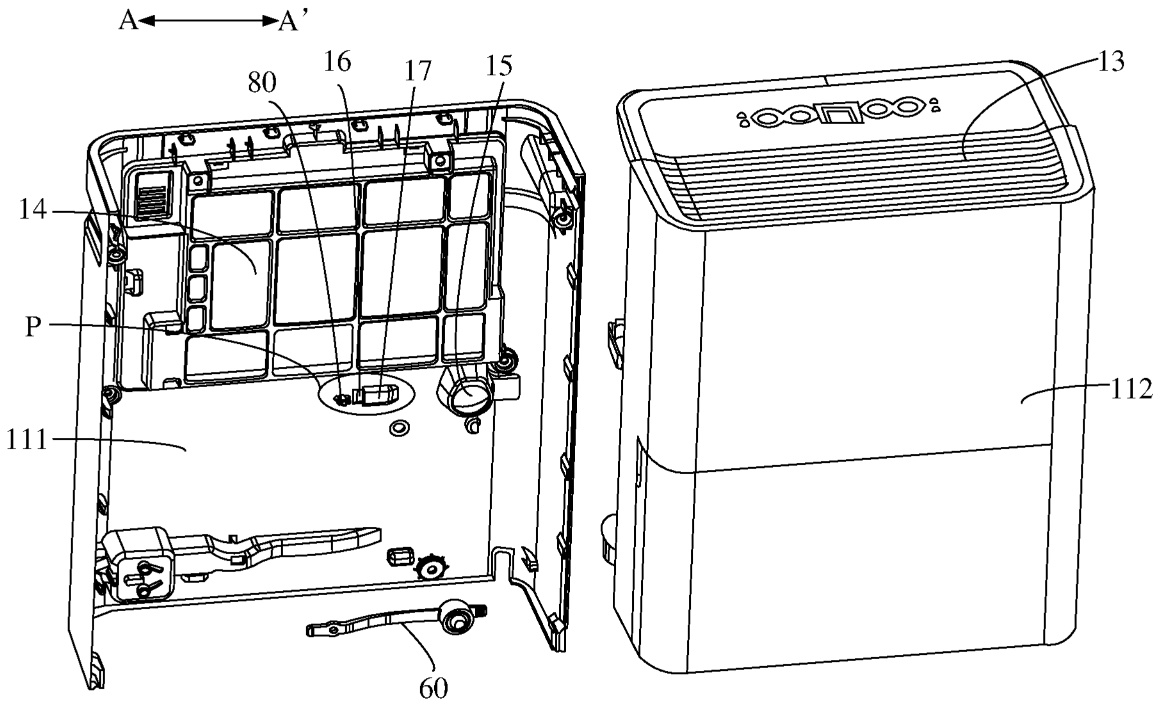
FIG. 4 is another exploded view of a dehumidifier, in accordance with some embodiments.

As shown in FIGS. 2 to 4, the back plate 11 includes an inner surface 111 and an outer surface 112. The inner surface 111 is a surface of the back plate 11 proximate to the interior of the machine body 20, and the outer surface 112 is a surface of the back plate 11 away from the interior of the machine body 20.

As shown in FIG. 3, the fan assembly 30 and the heat exchanger 40 are disposed inside the housing 10. The fan assembly 30 is disposed opposite to the air inlet 14 of the housing 10. In a case where the dehumidifier 100 is operating, indoor air enters the dehumidifier 100 through the air inlet 14, and the fan assembly 30 guides the indoor air to the heat exchanger 40.

Figure 20:
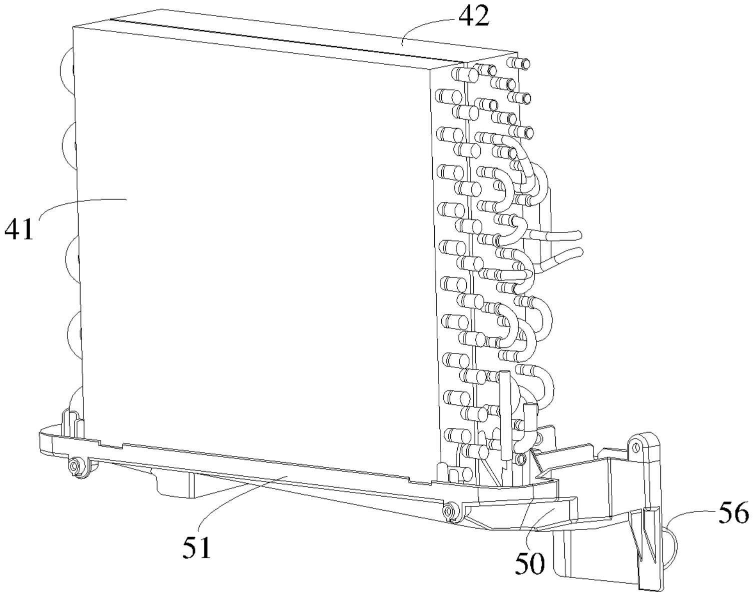
FIG. 20 is a structural diagram of a machine body, in accordance with some embodiments.
Figure 21:
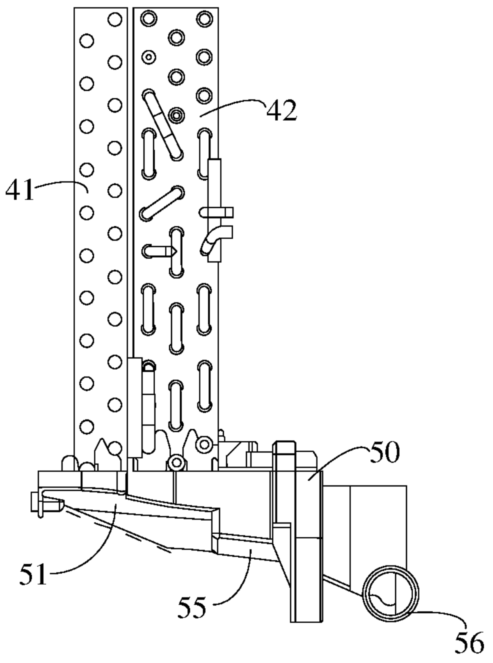
FIG. 21 is another structural diagram of a machine body, in accordance with some embodiments.

As shown in FIGS. 3, 20 and 21, the heat exchanger 40 is disposed inside the housing 10, and includes an evaporator 41 and a condenser 42. The evaporator 41 performs heat exchange with the indoor air introduced into the dehumidifier 100. The indoor air dissipates heat, and moisture in the indoor air condenses into condensed water on the surface of the evaporator 41. The condensed water flows into the water collecting pan 50 and is discharged from the dehumidifier 100 through the drainage hole 15. The dried indoor air performs heat exchange with the condenser 42. The indoor air absorbs heat, and is blown out from the air outlet 13.

The water collecting pan 50 (i.e., the water receiving pan) is disposed below the heat exchanger 40. The water collecting pan 50 is configured to collect condensed water generated on the surface of the evaporator 41 to prevent the condensed water from flowing into the machine body 20 and causing water leakage in the dehumidifier 100. In some embodiments, the drainage hole 15 is integrally formed with the water collecting pan 50.

The sealing plug assembly 60 is configured to seal the drainage hole 15 when the dehumidifier 100 does not require drainage.

A first end of the drainage pipe 70 is connected to the water collecting pan 50, and a second end of the drainage pipe 70 is communicated with the drainage hole 15. In a case where the water level in the water collecting pan 50 reaches a preset water level, the user discharges the water in the water collecting pan 50 from the drainage hole 15 through the drainage pipe 70. In this way, the water in the water collecting pan 50 may be prevented from flowing into the machine body 20.

In the related art, a first end of the sealing plug assembly is connected to the drainage hole 15, and a second end of the sealing plug assembly is connected to the outer surface 112 of the back plate 11 in general. During the use of the sealing plug assembly, especially in a case where the connection between the sealing plug assembly and the outer surface 112 is detachable, the sealing plug assembly may be separated from the outer surface 112 due to an action of external force when the sealing plug assembly is disengaged from the drainage hole 15, thereby affecting the reliability of the sealing plug assembly.

In order to solve the above problems, as shown in FIGS. 3 and 4, some embodiments of the present disclosure provide a dehumidifier 100. Different from the dehumidifier 100 in the related art, in some embodiments of the present disclosure, the dehumidifier 100 includes a fixing structure 80, and the housing 10 further includes an opening 16 and a shielding portion 17. The fixing structure 80 is disposed on the inner surface 111 of the back plate 11, and the opening 16 extends through the back plate 11 along the thickness direction of the back plate 11. An area of an orthogonal projection of the opening 16 on the back plate 11 is greater than an area of an orthogonal projection of the drainage hole 15 on the back plate 11.

The drainage hole 15 and the fixing structure 80 are respectively located on two sides of the opening 16 along a width direction of the back plate 11 (e.g., an AA' direction in FIG. 4). In a case where a first end of the sealing plug assembly 60 is connected to the drainage hole 15, a second end of the sealing plug assembly 60 may pass through the opening 16 to be connected with the fixing structure 80. In this way, a length of the sealing plug assembly 60 may be shortened, thereby ensuring the convenience of connecting the sealing plug assembly 60 with the fixing structure 80.

Figure 5:
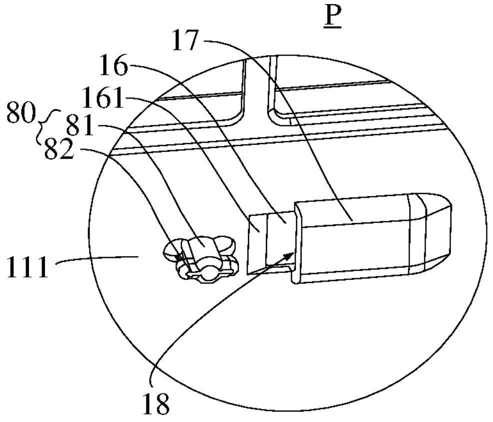
FIG. 5 is a partial enlarged view of the circle P in FIG. 4.

As shown in FIG. 5, a side of the opening 16 proximate to the fixing structure 80 is provided with a third inclined surface 161. The third inclined surface 161 extends obliquely in a direction from the inner surface 111 of the back plate 11 towards the outer surface 112 and away from the fixing structure 80. In this way, when the sealing plug assembly 60 extends into the opening 16, the sealing plug assembly 60 may be guided through the third inclined surface 161, which facilitates the installation of the sealing plug assembly 60 and the fixing structure 80 and prevents the sealing plug assembly 60 from bending at the third inclined surface 161.

In some embodiments of the present disclosure, a second cavity is formed on the shielding portion 17. An edge of the shielding portion 17 is connected to the inner surface 111 of the back plate 11, and the shielding portion 17 is connected to at least one edge of the opening 16.

The second cavity of the shielding portion 17 and the opening 16 together define a first through hole 18 (a punch hole). The first through hole 18 is opened towards the fixing structure 80, and a portion of the sealing plug assembly 60 is accommodated in the first through hole 18. In this way, while the sealing plug assembly 60 is connected to the fixing structure 80, the sealing plug assembly 60 is prevented from bending and causing the sealing plug assembly 60 to separate from the fixing structure 80, thereby increasing the reliability of the installation of the sealing plug assembly 60 and the fixing structure 80.

In some other embodiments of the present disclosure, the shielding portion 17 may also be provided by the back plate 11 connected to a side of the opening 16 away from the fixing structure 80 being recessed towards the machine body 20. The sealing plug assembly 60 passes through the shielding portion 17 and is connected to the fixing structure 80. The shielding portion 17 is opposite to the opening 16. In a case where the sealing plug assembly 60 is connected to the fixing structure 80, a portion of the sealing plug assembly 60 is accommodated in the shielding portion 17. In this way, the sealing plug assembly 60 is conveniently connected to the fixing structure 80 through the opening 16, thereby preventing the sealing plug assembly 60 from bending at the opening 16.

Figure 6:
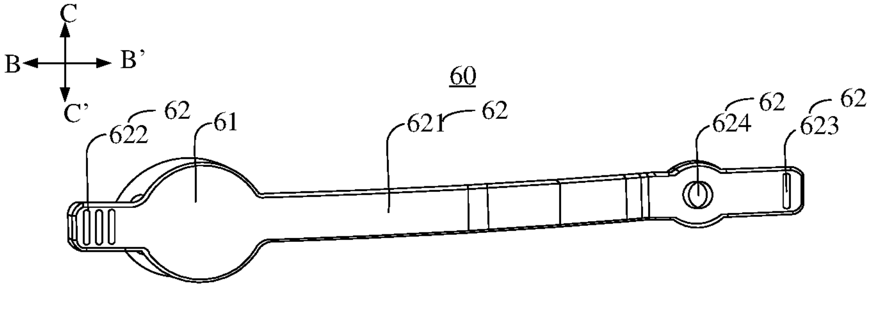
FIG. 6 is a structural diagram of a sealing plug assembly, in accordance with some embodiments.
Figure 7:
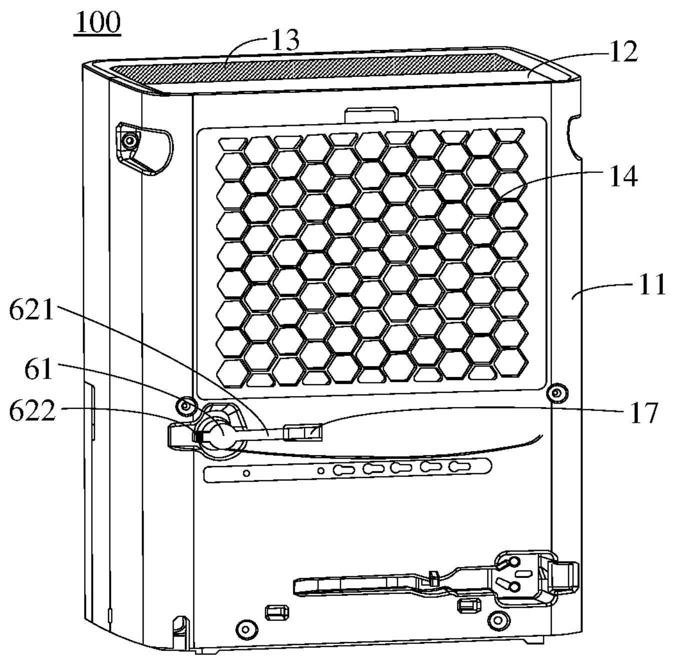
FIG. 7 is another structural diagram of a dehumidifier, in accordance with some embodiments.

As shown in FIGS. 6 and 7, in some embodiments of the present disclosure, the sealing plug assembly 60 includes a sealing plug body 61 and a connecting member 62. The sealing plug body 61 is detachably connected to the drainage pipe 70 through the drainage hole 15. A first end of the connecting member 62 is connected to the sealing plug body 61, and a second end of the connecting member 62 passes through the opening 16 and is connected to the fixing structure 80.

The connecting member 62 extends along its own length direction (e.g., a BB' direction in FIG. 6). The connecting member 62 includes a connecting member body 621, a first protruding rib 622, a second protruding rib 623 and a second through hole 624 (a through hole). The first protruding rib 622 and the second protruding rib 623 each are disposed on a surface of the connecting member body 621 away from the back plate 11. In some embodiments of the present disclosure, the first protruding rib 622 and the second protruding rib 623 may also be disposed on a surface of the connecting member body 621 proximate to the back plate 11. The second through hole 624 is disposed at an end of the connecting member body 621 away from the sealing plug body 61.

In some embodiments of the present disclosure, the connecting member 62 is provided with at least one first protruding rib 622 at an end of the connecting member 62 proximate to the sealing plug body 61, and the first protruding rib 622 extends along a width direction of the connecting member 62 (e.g., a CC' direction in FIG. 6). In a case where the connecting member 62 includes a plurality of first protruding ribs 622, the plurality of first protruding ribs 622 are disposed at intervals along the length direction of the connecting member 62. In this way, the friction between the sealing plug body 61 and the connecting member 62 may be increased when the user pulls out the sealing plug body 61, thereby increasing an anti-slip effect of the connecting member 62.

In some embodiments of the present disclosure, the connecting member 62 is provided with at least one second protruding rib 623 at the end away from the sealing plug body 61, and the second protruding rib 623 extends along the width direction of the connecting member 62. In a case where the connecting member 62 includes a plurality of second protruding ribs 623, the plurality of second protruding ribs 623 are disposed at intervals along the length direction of the connecting member 62. In this way, the friction between the user and the connecting member 62 may be increased when the user installs the connecting member 62, thereby facilitating the installation of the connecting member 62 and the fixing structure 80.

As shown in FIG. 5, the fixing structure 80 is a protrusion disposed on the inner surface 111 of the back plate 11. In some embodiments of the present disclosure, the fixing structure 80 includes a connecting segment 81 and a limiting segment 82. A first end of the connecting segment 81 is connected to the inner surface 111, and a second end of the connecting segment 81 extends towards the machine body 20. The connecting segment 81 is connected to the limiting segment 82. A maximum width of the limiting segment 82 in the width direction of the back plate 11 is greater than a maximum width of the connecting segment 81 in the width direction of the back plate 11. A cross-sectional area of the limiting segment 82 is greater than that of the connecting segment 81, that is, an area of an orthogonal projection of the limiting segment 82 in a direction parallel to the back plate 11 is greater than an area of an orthogonal projection of the connecting segment 81 in the direction parallel to the back plate 11, and the limiting segment 82 is symmetrically distributed relative to an axis of the connecting segment 81.

In some embodiments of the present disclosure, a width of a portion of the connecting member 62 corresponding to the fixing structure 80 is greater than a width of a remaining portion of the connecting member 62, so that a side of the connecting member 62 is in contact with the inner surface 111 of the back plate 11 while a side of the connecting member 62 away from the inner surface 111 of the back plate 11 is in contact with the limiting segment 82, thereby preventing an edge of the limiting segment 82 from exceeding the surface of the connecting member 62 away from the inner surface 111, thereby facilitating the connection between the sealing plug assembly 60 and the fixing structure 80.

Figure 8:
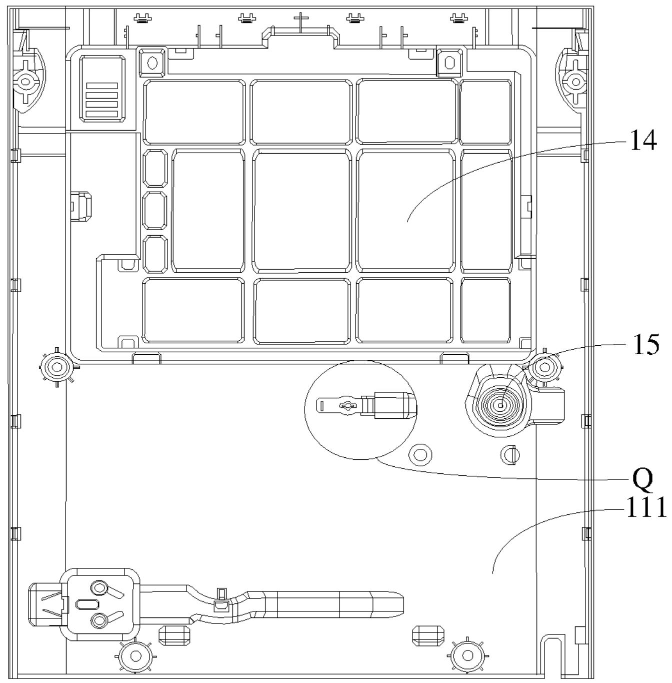
FIG. 8 is a structural diagram of a back plate of a dehumidifier, in accordance with some embodiments.
Figure 9:
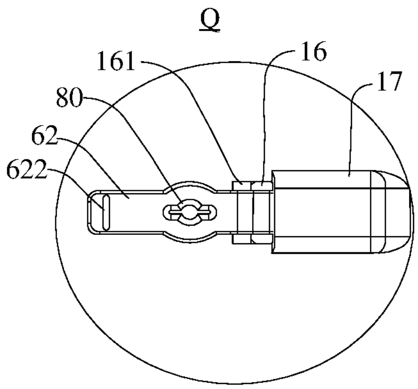
FIG. 9 is a partial enlarged view of the circle Q in FIG. 8.

As shown in FIGS. 8 and 9, in some embodiments of the present disclosure, during a process of installing the sealing plug assembly 60, the end of the connecting member 62 away from the sealing plug body 61 passes through the first through hole 18 and extends into the interior of the housing 10, and the limiting segment 82 passes through the second through hole 624, so that the connecting member 62 is connected to the connecting segment 81 of the fixing structure 80 on the inner surface 111. The connecting member 62 may be limited by the limiting segment 82, and the limiting segment 82 may disperse the stress generated when the sealing plug assembly 60 is pulled, thereby increasing the reliability of the connection between the fixing structure 80 and the connecting member 62, and preventing the connecting member 62 from detaching from the fixing structure 80.

The efficiency of installing the connecting member 62 may be improved through the cooperation between the fixing structure 80 and the second through hole 624, and the replacement of the connecting member 62 when the connecting member 62 is damaged may be facilitated, thereby reducing the cost of subsequent maintenance and use of the connecting member 62.

In some embodiments of the present disclosure, the inner surface 111 of the back plate 11 is provided with the fixing structure 80, so that the sealing plug assembly 60 may pass through the opening 16 and be cooperated with the fixing structure 80. In a case where the sealing plug body 61 needs to be pulled out from the drainage hole 15, the sealing plug body 61 may be connected to the fixing structure 80 of the back plate 11 through the second through hole 624, so as to avoid the sealing plug body 61 from being lost and increase the convenience of using the sealing plug body 61. Moreover, the connecting member 62 may be well connected to the fixing structure 80 through the first through hole 18, thereby avoiding or reducing the influence of the force applied to the sealing plug body 61 in the direction perpendicular to the back plate 11 on the connecting position between the connecting member 62 and the fixing structure 80, thus increasing the reliability and stability of the cooperation between the connecting member 62 and the fixing structure 80, and protecting the sealing plug assembly 60 well.

Figure 10:
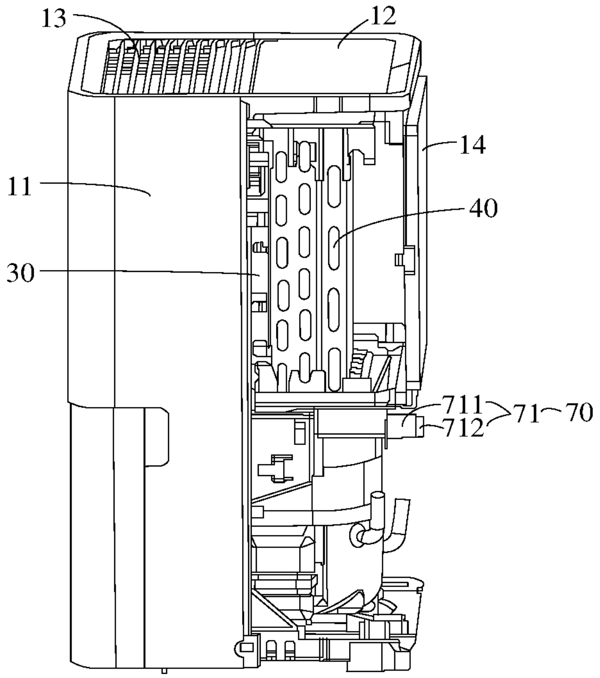
FIG. 10 is another structural diagram of a dehumidifier without a housing, in accordance with some embodiments.
Figure 11:
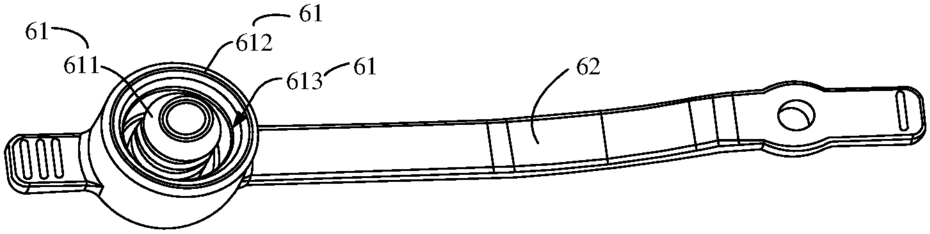
FIG. 11 is a structural diagram of another sealing plug assembly, in accordance with some embodiments.

As shown in FIGS. 10 and 11, the present disclosure provides a dehumidifier 100. In some embodiments of the present disclosure, the drainage pipe 70 includes an extending portion 71, and the extending portion 71 extends toward the outer surface 112 of the back plate 11.

The sealing plug body 61 is detachably connected to the extending portion 71 of the drainage pipe 70 through the drainage hole 15. The sealing plug body 61 is matched with the drainage hole 15 and configured to open and close the drainage hole 15. For example, in a case where the water collecting pan 50 needs to be drained, the sealing plug body 61 is pulled out from the drainage hole 15. In a case where the water in the water collecting pan 50 reaches a preset water level, the sealing plug body 61 is inserted into the drainage hole 15. It will be noted that the water collecting pan 50 does not need to be drained when the water level of the water in the water collecting pan 50 is within the preset water level.

In some embodiments of the present disclosure, the extending portion 71 includes a first extending segment 711 and a second extending segment 712. A first end of the second extending segment 712 is connected to the first extending segment 711, and a second end of the second extending segment 712 is communicated with the drainage hole 15.

In some embodiments of the present disclosure, the first extending segment 711 may extend obliquely in a direction from the extending portion 71 towards the outer surface 112 and in a direction towards the axis of the drainage pipe 70. The second extending segment 712 extends obliquely relative to the first extending segment 711 in a direction from the extending portion 71 towards the outer surface 112 and in a direction towards the axis of the drainage pipe 70.

It will be noted that an absolute value of a slope of the first extending segment 711 of the extending portion 71 is less than an absolute value of a slope of the second extending segment 712 of the extending portion 71. In this way, the drainage pipe 70 may have a certain guiding effect on the water flow, which increases the convenience of the connection between the extending portion 71 and the sealing plug body 61.

In some other embodiments of the present disclosure, the first extending segment 711 may also extend from the extending portion 71 towards the outer surface 112.

As shown in FIG. 11, the sealing plug body 61 is disposed on the connecting member 62, and the sealing plug body 61 includes a first annular structure 611 and a second annular structure 612. The first annular structure 611 and the second annular structure 612 are formed by the connecting member 62 extending towards the machine body 20. The first annular structure 611 and the second annular structure 612 are disposed at a side of the sealing plug body 61 facing towards the machine body 20 and spaced apart along a radial direction of the sealing plug body. The first annular structure 611 is located at an inner side the second annular structure 612 along a radial direction of the second annular structure 612. A first cavity 613 is defined between the first annular structure 611 and the second annular structure 612. In a case where the drainage hole 15 needs to be closed, the first cavity 613 is sealingly connected with at least a free end of the extending portion 71. For example, the first cavity 613 is sealingly connected with at least a portion of the extending portion 71.

In some embodiments of the present disclosure, a length of the first annular structure 611 in an axial direction of the sealing plug body 61 is greater than a length of the second annular structure 612 in the axial direction of the sealing plug body 61. In this way, it is possible to pre install the sealing plug body 61 and the drainage hole 15 to form a pre positioning, thereby avoiding the assembly of the sealing plug body 61 and the drainage hole 15 being out of position (for example, the sealing plug body 61 and the drainage hole 15 are misaligned, which leads to a risk of leakage) when assembling the sealing plug body 61, and increasing the sealing performance of the extending portion 71. Moreover, the connection between the first annular structure 611 and the extending portion 71 of the drainage pipe 70 may be convenient.

In some embodiments of the present disclosure, the first annular structure 611 is made of a material that is capable of undergoing elastic deformation, such as rubber. The second annular structure 612 is made of, for example, plastic. In this way, in a case where the sealing plug body 61 is connected to the extending portion 71, the first annular structure 611 may be elastically deformed and abut against an inner circumferential surface of the extending portion 71.

It will be noted that the inner circumferential surface of the extending portion 71 is a surface facing the axis of the extending portion 71.

Figure 12:
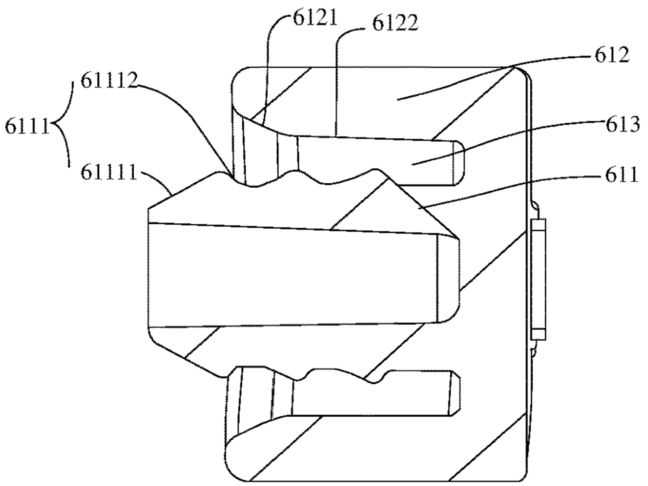
FIG. 12 is a sectional view of another sealing plug assembly, in accordance with some embodiments.

As shown in FIG. 12, the first annular structure 611 of the sealing plug body 61 includes at least one sealing rib 6111. The sealing rib 6111 is disposed on a side wall of the first annular structure 611 facing towards the second annular structure 612. The sealing rib 6111 extends in a circumferential direction of the first annular structure 611. In a case where the at least one sealing rib 6111 includes a plurality of sealing ribs 6111, the plurality of sealing ribs 6111 are disposed at intervals in an axial direction of the sealing plug body 61. In a case where the sealing plug body 61 and the extending portion 71 are connected, the sealing rib 6111 abuts against the inner circumferential surface of the extending portion 71.

In some embodiments of the present disclosure, the sealing rib 6111 includes a first inclined surface 61111 and a second inclined surface 61112. The first inclined surface 61111 is connected to the second inclined surface 61112. The first inclined surface 61111 is located at a side of the second inclined surface 61112 away from the connecting member 62, and an absolute value of a slope of the first inclined surface 61111 is less than an absolute value of a slope of the second inclined surface 61112.

In a case where the sealing plug body 61 is inserted into the extending portion 71, the first inclined surface 61111 abuts against the inner circumferential surface of the extending portion 71, and the first inclined surface 61111 is deformed towards the second inclined surface 61112 due to the action of external force. Since the slope of the first inclined surface 61111 is less, the force on the first inclined surface 61111 is mainly transmitted along the axial direction of the sealing plug body 61, which reduces the friction between the first inclined surface 61111 and the inner circumferential surface of the extending portion 71 and facilitates the connection between the sealing plug body 61 and the extending portion 71. Since the slope of the second inclined surface 61112 is greater, in a case where the first inclined surface 61111 is subjected to force, the second inclined surface 61112 may effectively support the first inclined surface 61111, thereby increasing the structural strength of the sealing rib 6111.

The sealing plug body 61 is connected to the extending portion 71 through the sealing rib 6111, which reduces a contact area between the sealing plug body 61 and the drainage pipe 70, and solves the problem of difficult installation of the sealing plug body 61 and the drainage pipe 70 in place in a case where the inner circumferential surface of the side wall of the sealing plug body 61 facing towards its axis is in surface contact with the inner circumferential surface of the drainage pipe 70. It is convenient for the sealing plug body 61 to seal the drainage hole 15. The convenience of connecting the sealing plug body 61 with the drainage pipe 70 is increased, the external force when the sealing plug body 61 is connected to the drainage pipe 70 is reduced, so that the sealing plug 61 is easy to be opened and closed. In a case where the first annular structure 611 includes the plurality of sealing ribs 6111, the sealing performance of the sealing plug body 61 to the drainage pipe 70 is increased, so that the reliability of the installation of the sealing plug body 61 and the drainage pipe 70 is high. In a case where one of the plurality of sealing ribs 6111 is damaged or the sealing performance is decreased due to long-term use, the remaining sealing ribs 6111 of the plurality of sealing ribs 6111 may ensure the sealing performance and avoid leakage. In addition, in a case where the drainage hole 15 needs to be opened, the case that the drainage hole 15 cannot be opened or the opening process is time-consuming and laborious may be avoided.

In some embodiments of the present disclosure, as shown in FIG. 12, the second annular structure 612 includes a first surface 6121 and a second surface 6122. The first surface 6121 and the second surface 6122 are connected to each other. The first surface 6121 and the second surface 6122 are both surfaces of the second annular structure 612 proximate to the axis of the sealing plug body 61, and the first surface 6121 is located at a side of the second surface 6122 away from the connecting member 62.

The first surface 6121 extends obliquely relative to the second surface 6122 in a direction away from the axis of the sealing plug body 61 and proximate to the drainage pipe 70 (referring to FIG. 10). A distance between the first surface 6121 and an outer circumferential surface of the drainage pipe 70 is greater than a distance between the second surface 6122 and an outer circumferential surface of the extending portion 71.

In this way, when the sealing plug body 61 and the drainage pipe 70 are assembled, the first surface 6121 plays a role of guiding the drainage pipe 70, thereby increasing the convenience of installation. Moreover, it is convenient for the drainage pipe 70 to pass through the first surface 6121 and connect with the second surface 6122, thereby reducing the difficulty of installing the sealing plug body 61.

In some embodiments of the present disclosure, the second surface 6122 may extend in the direction away from the axis of the sealing plug body 61. In this case, a slope of the second surface 6122 is less than a slope of the first surface 6121, so as to ensure that when the sealing plug body 61 is connected to the drainage pipe 70, the outer circumferential surface of the extending portion 71 at least abuts against the second surface 6122 of the second annular structure 612, and forms a seal for the drainage pipe 70. In this way, the second surface 6122 plays a role of guiding the drainage pipe 70 when the sealing plug body 61 and the drainage pipe 70 are assembled.

It will be noted that the outer circumferential surface of the extending portion 71 is a surface away from the axis of the extending portion 71.

Figure 13:
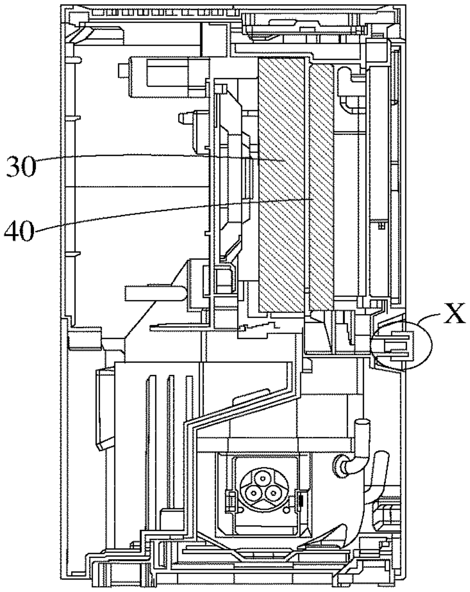
FIG. 13 is a sectional view of another dehumidifier, in accordance with some embodiments.
Figure 14:
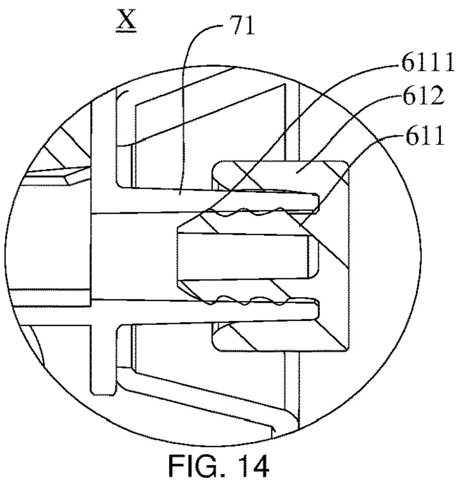
FIG. 14 is a partial enlarged view of the circle X in FIG. 13.

As shown in FIGS. 12 to 14, in a case where the sealing plug body 61 and the drainage pipe 70 are assembled, the extending portion 71 of the drainage pipe 70 is inserted into the first cavity 613 of the sealing plug body 61. The inner circumferential surface of the second annular structure 612 abuts against the outer circumferential surface of the extending portion 71, and at least abuts against the first extending segment 711 of the extending portion 71. The outer circumferential surface of the first annular structure 611 abuts against the inner circumferential surface of the extending portion 71, and the abutting is performed in an interference fit manner. In this way, the problem that the sealing plug body 61 has a poor sealing performance on the drainage hole 15 when the sealing plug body 61 and the drainage pipe 70 are sealed by a one-side abutting may be solved. In addition, the sealing plug body 61 clamps the extending portion 71 through the first annular structure 611 and the second annular structure 612, thereby enhancing the sealing performance of the sealing plug body 61 on the drainage hole 15, and increasing the flow path of water at the connection between the first cavity 613 and the extending portion 71.

It will be noted that the inner circumferential surface of the first annular structure 611 is a surface proximate to the axis of the first annular structure 611, and the outer circumferential surface of the first annular structure 611 is a surface away from the axis of the first annular structure 611. The inner circumferential surface of the second annular structure 612 is a surface proximate to the axis of the second annular structure 612, and the outer circumferential surface of the second annular structure 612 is a surface away from the axis of the second annular structure 612.

Figure 15:
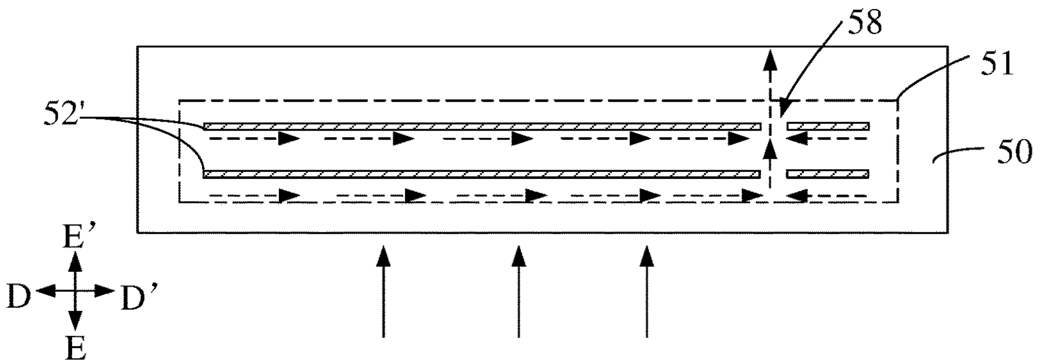
FIG. 15 is a diagram showing a usage state of a water collecting pan in the related art.

As shown in FIG. 15, in some embodiments, the water collecting pan 50 includes a water collecting groove 51 (i.e., a water receiving groove) and at least one supporting rib 52'. The supporting rib 52' is disposed on the water collecting groove 51, and extends along a length direction (e.g., a DD' direction in FIG. 15) of the water collecting groove 51. And, in a case where the at least one supporting rib 52' includes a plurality of supporting ribs 52', the plurality of supporting ribs 52' are disposed at intervals along a width direction (e.g., an EE' direction in FIG. 15) of the water collecting groove 51. An end of the supporting rib 52' is provided with a notch 58, and condensed water flows out of the water collecting pan 50 from the notch 58. In this way, in a process of the intake airflow provided by the indoor air passing through the dehumidifier 100, when most of the indoor air passes through the evaporator 41, the problem that a part of the indoor air will pass through the water collecting pan 50 under the evaporator 41, which may result in the part of the air failing to exchange heat with the evaporator 41, and reduce the heat exchange efficiency of the dehumidifier 100 may be solved.

An extending direction of the supporting rib 52' is perpendicular to an intake direction of the intake airflow, thus blocking most of the intake airflow from passing through the water collecting pan 50. However, the supporting rib 52' will hinder the flow of condensed water in the water collecting pan 50, as a result, water may be easily accumulated in a position where the supporting rib 52' is in contact with the water collecting groove 51, thereby breeding bacteria. In addition, when frozen water is accumulated in the water collecting pan 50 after being heat exchanged with the evaporator 41, condensation may be easily generated at the bottom of the water collecting pan 50. The condensation accumulates and drips, which may cause water leakage of the entire machine or damage to components, or even fire.

Figure 16:
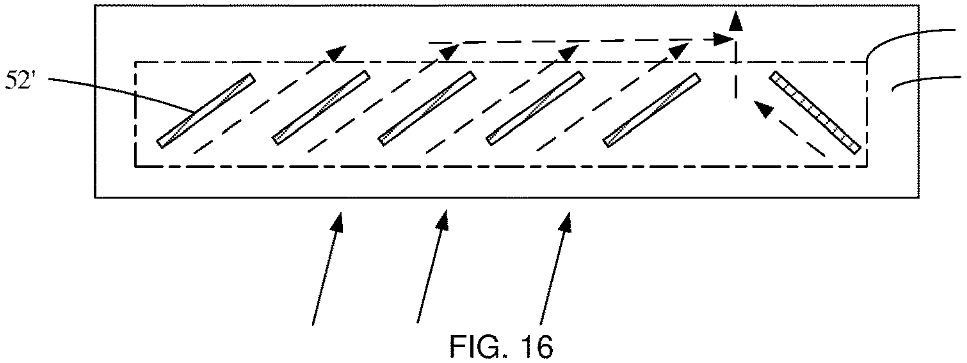
FIG. 16 is a diagram showing another usage state of a water collecting pan in the related art.

In some embodiments, as shown in FIG. 16, the at least one supporting rib 52' has a certain inclination angle with the intake direction of the intake airflow. And, in a case where the at least one supporting rib 52' includes a plurality of supporting ribs 52', the plurality of supporting ribs 52' are disposed at intervals along a length direction of the water collecting groove 51. In this case, the condensed water in the water collecting pan 50 flows smoothly, so that the supporting rib 52 guiding the condensed water to discharge from the dehumidifier 100 may be implemented. However, the intake airflow may easily pass through a gap between two adjacent supporting ribs 52', resulting in poor blocking effect of the supporting ribs 52' on the intake airflow, thereby reducing the heat exchange efficiency of the dehumidifier 100.

Figure 17:
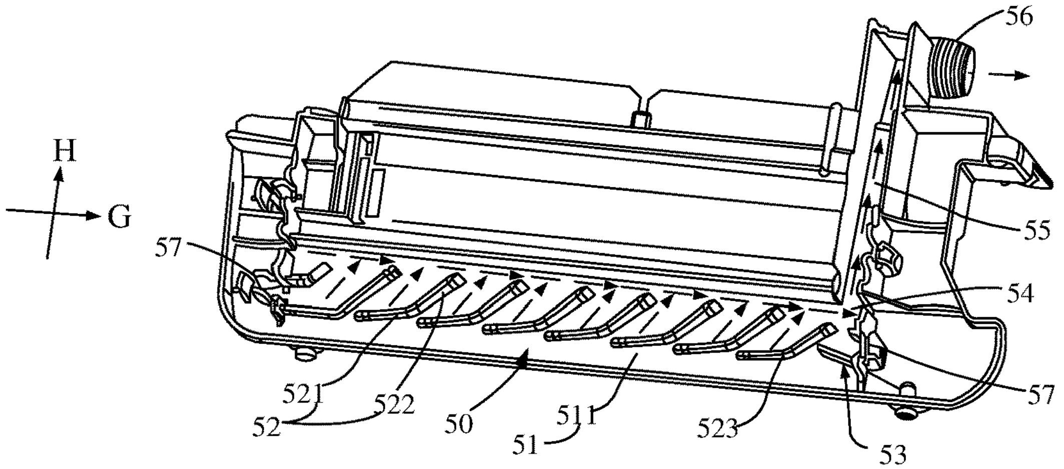
FIG. 17 is a structural diagram of a water collecting pan, in accordance with some embodiments.

As shown in FIG. 17, in some embodiments of the present disclosure, the water collecting pan 50 includes a water collecting groove 51, a plurality of first supporting ribs 52, a second supporting rib 53 and a water guiding port 54. The water collecting groove 51 extends along a length direction of the water collecting pan 50. A first end of the water guiding port 54 is communicated with the water collecting groove 51, and a second end of the water guiding port 54 is communicated with the drainage pipe 70.

In some embodiments of the present disclosure, in order to improve the practicality of the dehumidifier 100, the condensed water is generally discharged from a side of the dehumidifier 100 away from the air inlet 14. Therefore, the drainage pipe 70 is disposed at the side of the dehumidifier 100 away from the air inlet 14, and the water guiding port 54 is disposed at a side of the water collecting pan 50 away from the air inlet 14.

The water collecting groove 51 includes a first bottom wall 511 (a bottom wall), and the plurality of first supporting ribs 52 are disposed on the first bottom wall 511 of the water collecting groove 51 at intervals along the length direction of the water collecting groove 51. The first supporting rib 52 includes a first wind shielding segment 521 (wind shielding segment) and a water guiding segment 522. An end of the water guiding segment 522 is connected to a first end of the first wind shielding segment 521.

In some embodiments of the present disclosure, the first wind shielding segment 521 extends along a first direction and is configured to block the intake airflow entering between two adjacent first supporting ribs 52. The water guiding segment 522 extends along a second direction, and is configured to guide the condensed water to flow to the water guiding port 54. It will be noted that the first direction may be refer to a direction (e.g., a direction G in FIG. 17) along the length direction of the water collecting pan 50, and proximate to the water guiding port 54. The second direction may be refer to a direction (e.g., a direction H in FIG. 17) from a side proximate to the air inlet 14 to a side away from the air inlet 14. In this case, an angle between the first wind shielding segment 521 and the water guiding segment 522 may be a right angle.

Figure 18:
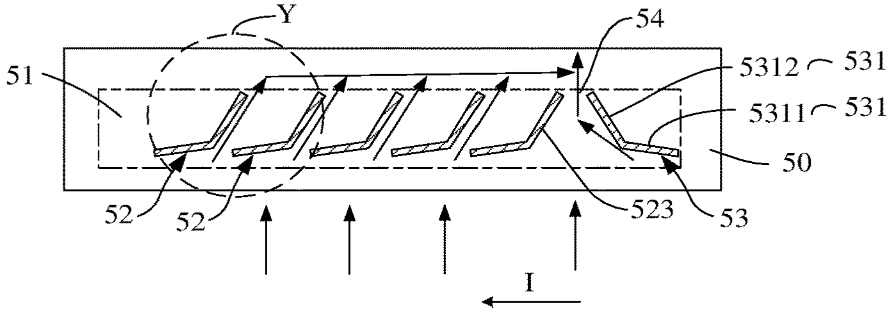
FIG. 18 is a diagram showing a usage state of a water collecting pan, in accordance with some embodiments.
Figure 19:
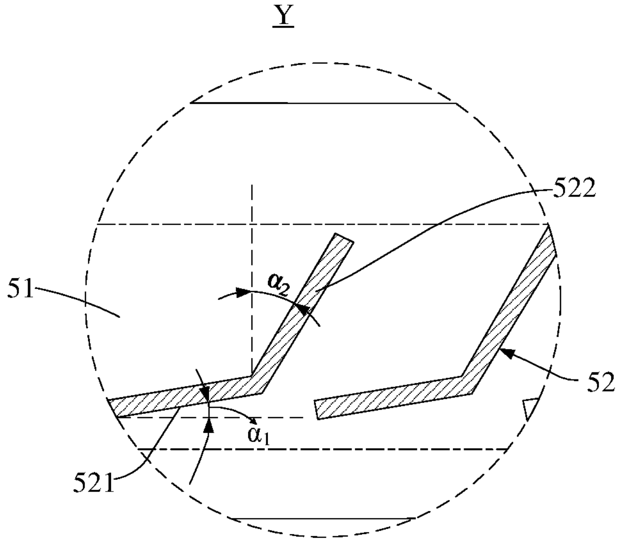
FIG. 19 is a partial enlarged view of the circle Y in FIG. 18.

In some other embodiments of the present disclosure, as shown in FIGS. 18 and 19, the first wind shielding segment 521 extends obliquely in the first direction and towards a side of the water collecting pan 50 provided with the water guiding port 54. For example, an angle of the first direction may be 0°, and a first inclination angle between an extending direction of the first wind shielding segment 521 and the first direction is $\alpha_1$, and the first inclination angle $\alpha_1$ may be, for example, 3°, 5° or 10°. In this way, when the condensed water passes through the first wind shielding segment 521, it may quickly flow towards the side of the water collecting pan 50 provided with the water guiding port 54, thereby improving the drainage efficiency of the dehumidifier 100.

The water guiding segment 522 extends obliquely from a second end of the first wind shielding segment 521 along the second direction and towards the side of the water collecting pan 50 provided with the guiding port 54. For example, an angle of the second direction may be 0°, and a second inclination angle between the extending direction of the water guiding segment 522 and the second direction is $\alpha_2$. The second inclination angle $\alpha_2$ may be, for example, 5°, 10° or 15°. In this way, the condensed water may be quickly guided to the water guiding port 54, thereby improving the drainage efficiency of the dehumidifier 100. In this case, an angle between the first wind shielding segment 521 and the water guiding segment 522 may be an obtuse angle.

In some embodiments of the present disclosure, the plurality of first supporting ribs 52 are all located at a same side of the water guiding port 54 along the length direction of the water collecting groove 51.

In this way, the first supporting rib 52 may reduce the intake airflow passing through the water collecting pan 50, and the first wind shielding segment 521 improves the heat exchange efficiency of the dehumidifier 100. The water guiding segment 522 improves the drainage efficiency of the dehumidifier 100, thereby preventing water accumulation in the water collecting pan 50 and the breeding of bacteria in the water collecting pan 50, and improving the health of use. In addition, the condensation generated at the bottom of the water collecting pan 50 is effectively avoided, thereby preventing the dehumidifier 100 from leaking.

One of the plurality of first supporting ribs 52 proximate to the water guiding port 54 is an end first supporting rib 523.

The second supporting rib 53 is disposed on the first bottom wall 511 of the water collecting groove 51, and spaced apart from the end first supporting rib 523 along the length direction of the water collecting groove 51. The water guiding port 54 is located between the second supporting rib 53 and the end first supporting rib 523, and the water guiding port 54 is disposed proximate to any one of two ends of the water collecting groove 51 along the length direction of the water collecting groove 51.

As shown in FIGS. 17 and 18, in some embodiments of the present disclosure, the second supporting rib 53 includes a second wind shielding segment 531 (a wind blocking segment), and the second wind shielding segment 531 extends obliquely along a third direction and towards the side of the water collecting pan 50 provided with the water guiding port 54. The second wind shielding segment 31 is configured to block the airflow entering between the second supporting rib 53 and the end first supporting rib 523.

It will be noted that the third direction is a direction (e.g., a direction I in FIG. 18) from a side away from the first supporting rib 52 towards a side proximate to the first supporting rib 52.

The second wind shielding segment 531 may be a straight structure. Alternatively, the second wind shielding segment 531 may be a bent structure. In some embodiments, in a case where the second wind shielding segment 531 is a bent structure, the second wind shielding segment 531 includes a first bending portion 5311 and a second bending portion 5312. The first bending portion 5311 extends obliquely from an end of the first bending portion 5311 away from the water guiding port 54 along the third direction and towards the side of the water collecting pan 50 provided with the water guiding port 54. The second bending portion 5312 extends obliquely from an end of the first bending portion 5311 proximate to the water guiding port 54 along the second direction towards the water guiding port 54. In this way, the second wind shielding segment 531 of the second supporting rib 53 may effectively block the airflow entering between the second supporting rib 53 and the end first supporting rib 523, thereby improving the heat exchange efficiency of the dehumidifier 100.

In some embodiments of the present disclosure, as shown in FIG. 17, the water collecting pan 50 further includes a water guiding groove 55 and a water outlet 56. The water guiding groove 55 extends along a width direction of the water collecting pan 51. An end of the water guiding groove 55 proximate to the air inlet 14 is communicated with the water guiding port 54, and an end of the water guiding groove 55 away from the air inlet 14 is communicated with the water outlet 56, so as to discharge the condensed water discharged from the water guiding port 54 to the outside of the water collecting pan 50 through the water guiding groove 55 and the water outlet 56, and ensure smooth drainage. Moreover, the condensed water is guided to the end of the water collecting pan 50 away from the air inlet 14.

In some embodiments, the bottom wall of the water guiding groove 55 is inclined along the second direction towards the end away from the evaporator 41, so that the condensed water in the water guiding groove 55 may be quickly converged to the water outlet 56 due to the height difference, thereby improving the drainage efficiency.

The condensed water flowing out of the water guiding port 54 may be discharged from the water collecting pan 50 through the drainage pipe 70.

In some embodiments of the present disclosure, as shown in FIGS. 20 and 21, the first bottom wall 511 of the water collecting pan 51 may be obliquely disposed along the first direction towards the end away from the evaporator 41. The first bottom wall 511 of the water collecting groove 51 may further be obliquely disposed along the second direction towards the end away from the evaporator 41. In this way, the condensed water in the water collecting groove 51 may be quickly converged to the water guiding port 54 due to the height difference, and discharged from the dehumidifier 100 through the water guiding groove 55 and the water outlet 56, thereby improving the drainage efficiency.

In some embodiments of the present disclosure, as shown in FIG. 17, the water collecting pan 50 further includes a supporting portion 57. The supporting portion 57 is disposed on at least one of the two ends of the water collecting groove 51 along the length direction of the water collecting groove 51. At least one of two sides of the bottom of the evaporator 41 extending along the length direction of the water collecting groove 51 abuts against the corresponding supporting portion 57. The supporting portion 57 plays a role of supporting and fixing the evaporator 41, so as to prevent the evaporator 41 from squeezing at least one of the first supporting rib 52 or the second supporting rib 53, and prevent the first supporting rib 52 or the second supporting rib 53 from being worn, thereby ensuring the installation stability of the evaporator 41 inside the dehumidifier 100.

Figure 22:
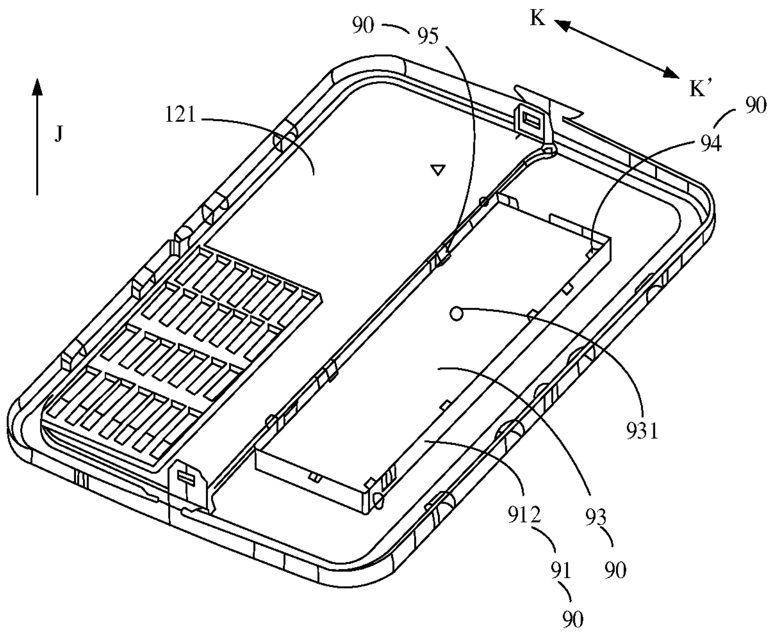
FIG. 22 is a structural diagram of a box body of a dehumidifier, in accordance with some embodiments.
Figure 23:
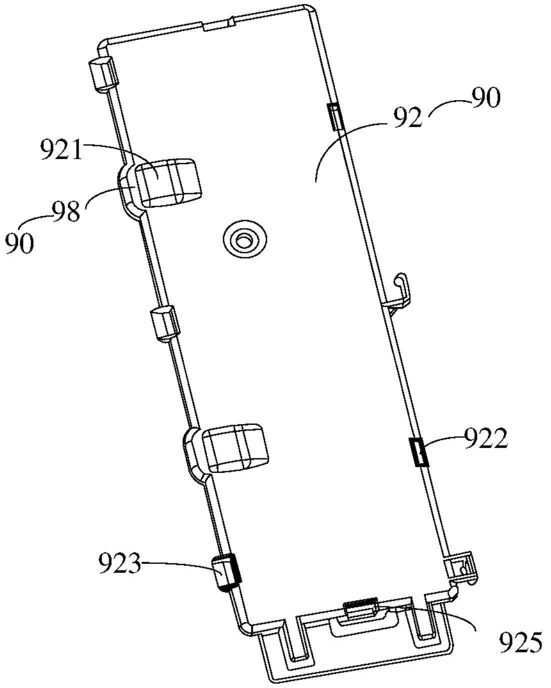
FIG. 23 is a structural diagram of a cover body of a dehumidifier, in accordance with some embodiments.

In some embodiments of the present disclosure, as shown in FIGS. 22 and 23, the dehumidifier 100 further includes an electrical control box 90. The electrical control box 90 of the dehumidifier 100 provides a guarantee for the normal operation of the dehumidifier 100. However, in the related art, the circuit boards in most of the electrical control boxes 90 are fixedly installed, which makes it impossible to flexibly remove the circuit boards, thereby making it inconvenient for operators to inspect and replace the circuit boards.

In some embodiments of the present disclosure, the top plate 12 includes a top plate inner surface 121 and a top plate outer surface 122. The top plate inner surface 121 is a surface of the top plate 12 proximate to the interior of the machine body 20, and the top plate outer surface 122 is a surface of the top plate 12 away from the interior of the machine body 20.

Figure 24:
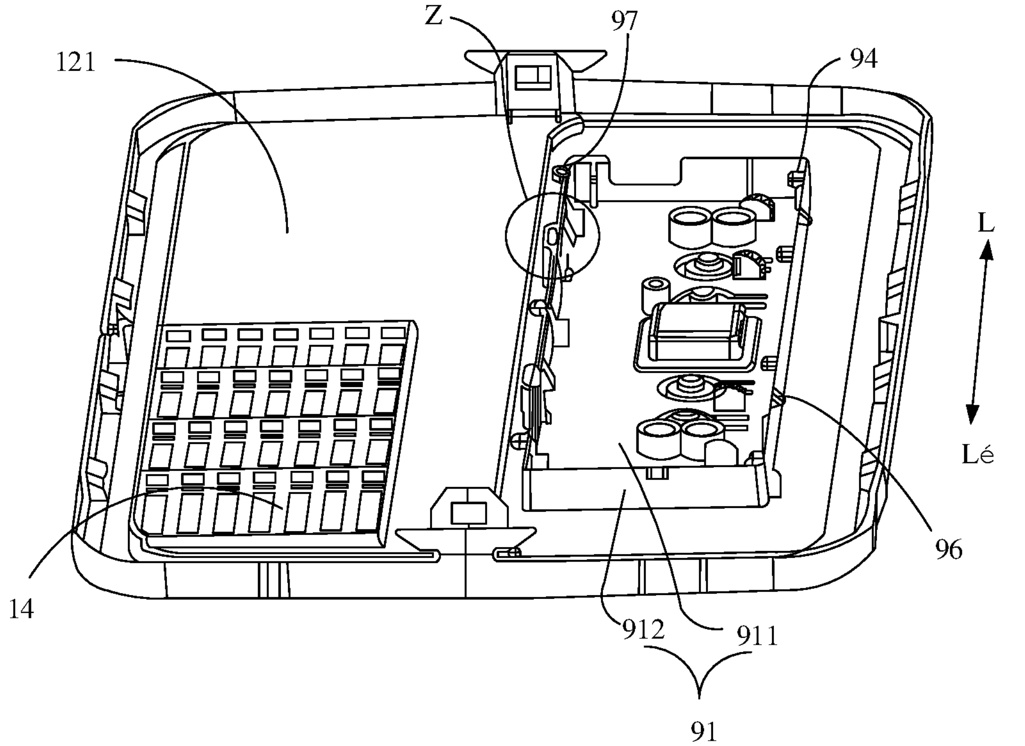
FIG. 24 is another structural diagram of a box body of a dehumidifier, in accordance with some embodiments.
Figure 27:
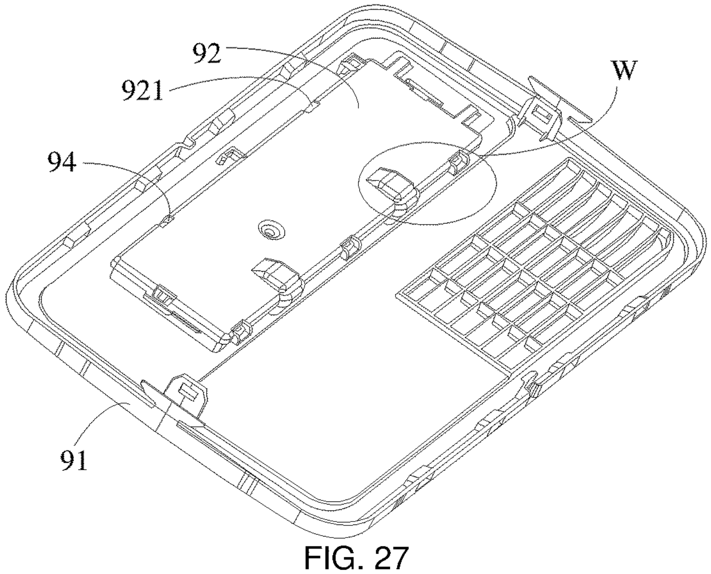
FIG. 27 is yet another structural diagram of a box body of a dehumidifier, in accordance with some embodiments.

As shown in FIGS. 22 and 27, the electrical control box 90 is disposed on the top plate inner surface 121 of the top plate 12. The electrical control box 90 includes a box body 91, a cover body 92, a circuit board 93, at least one first fixing buckle 94 and at least one first elastic buckle 95. As shown in FIG. 24, the box body 91 includes a second bottom wall 911 (a box body bottom wall) and a side wall 912. The box body 91 is connected to the top plate inner surface 121 through the second bottom wall 911, and a side wall 912 extends from the second bottom wall 911 along a fourth direction. The cover body 92 covers the box body 91 to close the box body 91. The cover body 92 and the box body 91 together define a third cavity, and the circuit board 93 is located in the third cavity, so that the components in the third cavity may be protected. An area of the circuit board 93 is approximately equal to an area of the second bottom wall 911. In a case where the circuit board 93 is installed in the third cavity, the circuit board 93 is prevented from moving in the third cavity along the width direction (e.g., a KK' direction in FIG. 22) of the box body 91 due to the area of the circuit board 93 being less than the area of the second bottom wall 911.

It will be noted that the fourth direction is a direction (e.g., a J direction in FIG. 22) from the top plate outer surface 122 of the dehumidifier 100 to the top plate inner surface 121, and perpendicular to the top plate 12.

The first fixing buckle 94 is disposed on a side wall of the box body 91 extending along a length direction of the box body 91, and the first elastic buckle 95 is disposed on another side of the box body 91 extending along the length direction of the box body 91. The circuit board 93 is installed in the third cavity through the first fixing buckle 94 and the first elastic buckle 95, so as to limit the circuit board 93 from moving towards the cover body 92.

In some embodiments of the present disclosure, as shown in FIG. 24, the first fixing buckle 94 is a protrusion disposed on the side wall of the box body 91. After the circuit board 93 is installed, the circuit board 93 is located at a side of the first fixing buckle 94 away from the cover body 92. A first end of the first fixing buckle 94 is connected to the side wall 912, and a second end of the first fixing buckle 94 extends towards the center of the box body 91. In this way, the first fixing buckle 94 limits the circuit board 93 from moving towards the cover body 92, thereby preventing the circuit board 93 from being damaged due to the collision with the cover body 92 or the box body 91.

In some embodiments of the present disclosure, in a case where the electrical control box 90 includes a plurality of first fixing buckles 94, the plurality of first fixing buckles 94 are disposed on a same side wall of the box body 91, located on a surface of the side wall proximate to the center of the box body 91, and spaced apart along the length direction (e.g., an LL' direction in FIG. 24) of the box body 91. In this way, the fixing effect on the circuit board 93 may be strengthened, and the circuit board 93 may be prevented from being broken due to uneven force, thereby protecting the circuit board 93 from being damaged.

In a case where the electrical control box 90 includes a plurality of first elastic buckles 95, the plurality of first elastic buckles 95 are disposed on another side wall of the box body 91 corresponding to the side wall where the first fixing buckle 94 is located, and spaced apart along the length direction of the box body 91.

The circuit board 93 includes a key side and a non-key side. The key side is a side of the circuit board 93 where keys are provided, and the non-key side is another side of the circuit board 93 away from the keys. In some embodiments of the present disclosure, the key side is disposed proximate to the first fixing buckle 94, and the non-key side is disposed proximate to the first elastic buckle 95. Since the first fixing buckle 94 is not capable of being deformed, even if the user presses the key of the circuit board 93 hard, the circuit board 93 may abut against the first fixing buckle 94, so as to ensure the effectiveness of pressing the key, thereby ensuring the normal operation of the dehumidifier 100.

In some embodiments of the present disclosure, as shown in FIG. 22, the circuit board 93 is provided with a circuit board through hole 931. The operators may install the circuit board 93 in the box body 91 or remove the circuit board 93 from the box body 91 through the circuit board through hole 931, thereby improving the assembly efficiency of the circuit board 93.

Figure 25:
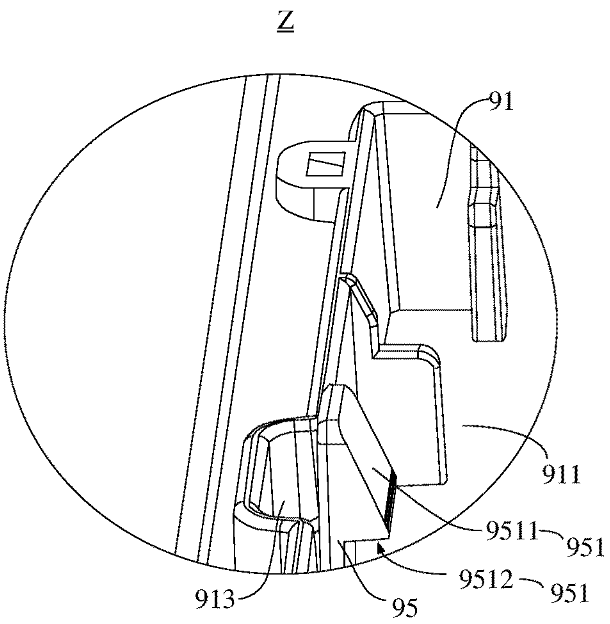
FIG. 25 is a partial enlarged view of the circle Z in FIG. 24.

As shown in FIG. 25, in some embodiments of the present disclosure, the box body 91 is formed with at least one first avoidance groove 913 protruding away from the center of the box body 91, and the first elastic buckle 95 is disposed at the first avoidance groove 913. A first end of the first elastic buckle 95 is connected to the second bottom wall 911 of the box body 91, and a second end of the first elastic buckle 95 extends in a direction away from the bottom wall 911. The second end of the first elastic buckle 95 is provided with a buckle portion 951. After the circuit board 93 is installed, the buckle portion 951 is located at a side of the circuit board 93 proximate to the cover body 92 and protrudes towards the center of the box body 91. The first avoidance groove 913 is configured to accommodate the buckle portion 951 in a case where the first elastic buckle 95 is deformed, so as to prevent the buckle portion 951 from interfering with the side wall 912 of the box body 91.

A surface of the buckle portion 951 proximate to the center of the box body 91 is a buckle portion inclined surface 9511, and the buckle portion inclined surface 9511 extends obliquely in the fourth direction and towards a direction proximate to the first avoidance groove 913. In this way, during the installation process of the circuit board 93, the buckle portion inclined surface 9511 plays a role of guiding the circuit board 93, so as to quickly install the circuit board 93 into the third cavity.

A surface of the buckle portion 951 proximate to the second bottom wall 911 is a buckle portion bottom surface 9512. A side of the circuit board 93 facing towards the cover body 92 abuts against the buckle portion bottom surface 9512, in this way, it is possible to limit the movement of the circuit board 93 towards the cover body 92, prevent damage caused by movement of the circuit board 93 in the third cavity.

When the circuit board 93 is installed, a side of the circuit board 93 in the width direction of the circuit board 93 is pressed against the side of the first fixing buckle 94 away from the cover body 92 first, and then another side of the circuit board 93 in the width direction of the circuit board 93 is squeezed against the buckle portion inclined surface 9511 of the first elastic buckle 95, and is pressed into the third cavity of the box body 91. In this case, the buckle portion 951 of the first elastic buckle 95 returns to an initial state. In this way, the first elastic buckle 95 fixes the other side of the circuit board 93 through the buckle portion bottom surface 9512, and finally the cover body 92 is covered on the box body 91, so as to complete the installation of the electrical control box 90.

In a case where the circuit board 93 needs to be disassembled, push a side wall of the first elastic buckle 95 in a direction (i.e., a direction K shown in FIG. 22) away from the first fixed buckle 94, which may detach the circuit board 93 from the first elastic buckle 95, and then take the circuit board 93 out of the box body 91. In this way, it is convenient to inspect and replace the circuit board 93, thereby improving the efficiency of repairing the electrical control box 90.

In some embodiments of the present disclosure, as shown in FIGS. 22 and 23, an end of the first elastic buckle 95 away from the second bottom wall 911 exceeds an edge of the side wall 912 of the box body 91. In this case, at least one second avoidance groove 921 is formed on the cover body 92, and the second avoidance groove 921 is disposed opposite to the first elastic buckle 95, so that the end of the first elastic buckle 95 away from the second bottom wall 911 extends into the second avoidance groove 921, and a surface of the second avoidance groove 921 away from the first fixing buckle 94 abuts against the end of the first elastic buckle 95 away from the second bottom wall 911. In this way, it may be possible to prevent the deformation of the first elastic buckle 95 in a direction away from the center of the box body 91, causing the circuit board 93 to lose the restriction of the first elastic buckle 95 and move inside the box body 91, thereby preventing the circuit board 93 from being damaged.

As shown in FIG. 24, in some embodiments of the present disclosure, the electrical control box 90 further includes at least one of a second elastic buckle 96 and a second fixing buckle 97.

Figure 29:
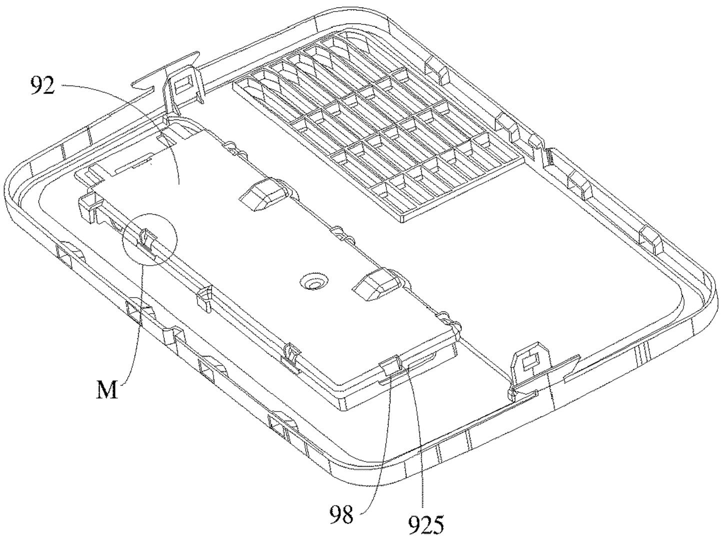
FIG. 29 is yet another structural diagram of a box body of a dehumidifier, in accordance with some embodiments.
Figure 30:
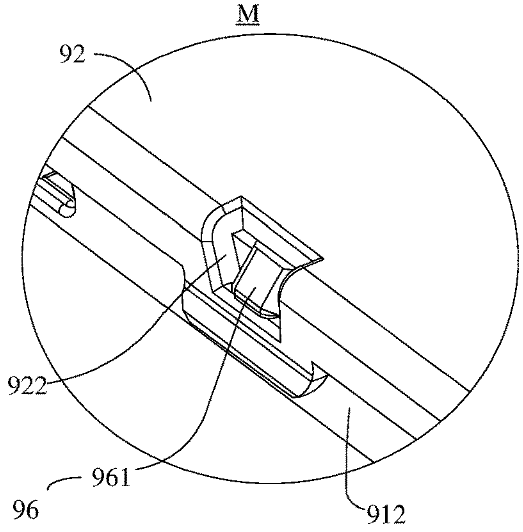
FIG. 30 is a partial enlarged view of the circle M in FIG. 29.

As shown in FIG. 24, FIG. 29 and FIG. 30, in a case where the electrical control box 90 includes the second elastic buckle 96, the second elastic buckle 96 is disposed on the side wall of the box body 91 provided with the first fixing buckle 94, and located at a surface of the side wall away from the center of the box body 91. A first end of the second elastic buckle 96 is connected to the side wall 912 of the box body 91, and a second end of the second elastic buckle 96 extends in the direction away from the center of the box body 91. The second elastic buckle 96 includes a first buckle portion inclined surface 961. The first buckle portion inclined surface 961 of the second elastic buckle 96 extends obliquely in the fourth direction and in the direction proximate to the center of the box body 91. The second elastic buckles 96 and the first fixing buckles 94 are alternately disposed along the length direction of the box body 91.

In this case, the cover body 92 is formed with at least one first matching hole 922, and the second elastic buckle 96 is matched with the first matching hole 922. The cover body 92 is connected to the opening of the box body 91 through the second elastic buckle 96. In this way, the cover body 92 may be quickly installed on the box body 91 through the second elastic buckle 96, and conveniently removed 92 from the box body 91 to inspect the circuit board 93.

In a case where the electrical control box 90 includes a plurality of second elastic buckles 96, the plurality of second elastic buckles 96 are spaced apart from each other along the length direction of the box body 91.

Figure 28:
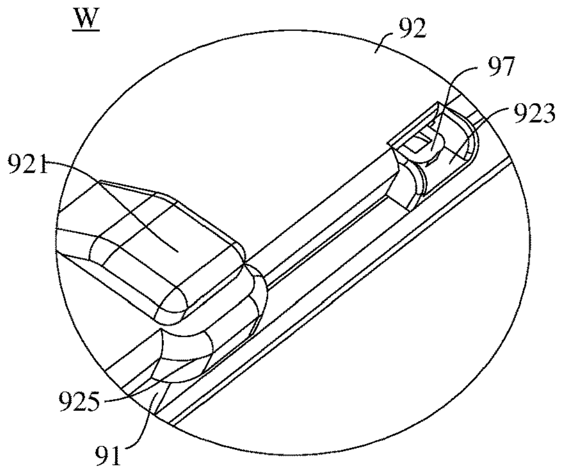
FIG. 28 is a partial enlarged view of the circle W in FIG. 27.

As shown in FIGS. 27 and 28, in a case where the electrical control box 90 includes the second fixing buckle 97, the second fixing buckle 97 is disposed on a side wall of the box body 91 provided with the first elastic buckle 95, and located at a surface of the side wall away from the center of the box body 91. A first end of the second fixing buckle 97 is connected to the side wall 912 of the box body 91, and a second end of the second fixing buckle 97 extends in the direction away from the center of the box body 91. The second fixing buckle 97 and the first elastic buckle 95 are staggered along the length direction of the box body 91.

Figure 26:
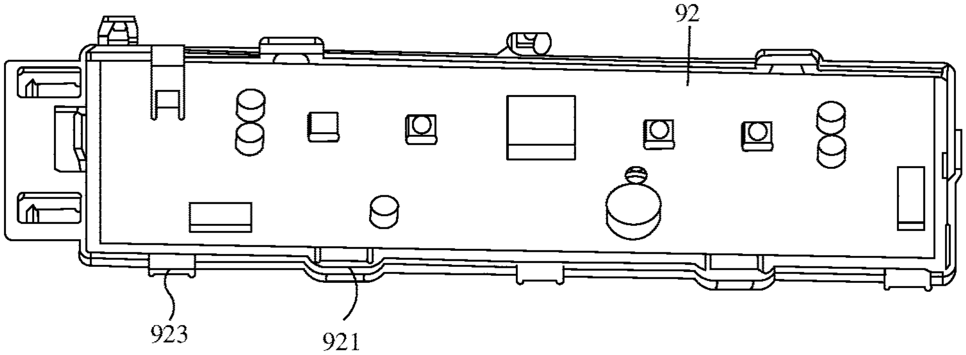
FIG. 26 is another structural diagram of a cover body of a dehumidifier, in accordance with some embodiments.

As shown in FIGS. 26 to 28, in this case, the cover body 92 is formed with at least one second matching hole 923, and the second fixing buckle 97 is matched with the second matching hole 923. The cover body 92 is connected to the opening of the box body 91 through the second fixing buckle 97, so that the second fixing buckle 97 may ensure the connection reliability between the cover body 92 and the box body 91.

In a case where the electrical control box 90 includes a plurality of second fixing buckles 97, the plurality of second fixing buckles 97 are spaced apart from each other along the length direction of the box body 91.

In a case where the cover body 92 and the box body 91 are assembled, the second matching hole 923 of the cover body 92 is first matched with the second fixing buckle 97 to fix a side of the cover body 92 along the width direction of the cover body 92, and then the first matching hole 922 is matched with the second elastic buckle 96 to fix another side of the cover body 92 along the width direction of the cover body 92. In this way, the installation of the cover body 92 on the box body 91 may be implemented, and the connection reliability between the cover body 92 and the box body 91 may be improved through the second fixing buckle 97 and the second elastic buckle 96. The connection method is simple and easy to operate.

In some embodiments of the present disclosure, the box body 91 is provided with a shielding plate. The shielding plate extends in a circumferential direction of the second matching hole 923, and a side of the shielding plate away from the box body 91 is opened. The shielding plate is configured to protect the second fixing buckle 97, so as to prevent the second fixing buckle 97 from breaking due to the interference with other components.

As shown in FIG. 29, in some embodiments of the present disclosure, two side walls of the box body 91 along the length direction thereof each are provided with a third elastic buckle 98. The cover body 92 is formed with a third matching holes 925. The third elastic buckles 98 are matched with the third matching holes 925, so that the cover body 92 may be more securely installed on the box body 91. While ensuring the structural strength of the box body 91, the cover body 92 may be prevented from being separated from the box body 91.

In a case where the electrical control box 90 generates heat, the air flowing towards the air outlet 13 will perform heat exchange with the electrical control box 90, so as to reduce the temperature of the electrical control box 90 and ensure the normal operation of the electrical control box 90.

In the description of the above embodiments, specific features, structures, materials, or characteristics may be combined in any one or more embodiments or examples in a suitable manner.

It will be noted that any technical solution disclosed in the present disclosure may to some extent solve one or more technical problems and implement certain disclosure objectives. A plurality of technical solutions may also be combined into a comprehensive solution to solve one or more technical problems and implement certain disclosure objectives. It is also possible to choose a combination of partially disclosed technologies to form a comprehensive solution, while adopting relevant art and degradation solutions. However, the technology disclosure method may compensate for the degradation trend and solve one or more technical problems to a certain extent, as well as achieve certain disclosure objectives. Each technology disclosure combined into a complete technical solution constitutes an organic and inseparable overall solution, which solves technical problems and achieves certain disclosure objectives as a whole.

Any technical disclosure in the present disclosure, as well as the recombination of the plurality of technical disclosures, can form a complete technical solution, and can solve one or more of the above-mentioned technical problems to achieve the disclosure purpose, which belongs to the content of the present disclosure and is directly and unambiguously determined based on the content of the present disclosure.

A person skilled in the art will understand that the scope of disclosure in the present disclosure is not limited to specific embodiments discussed above, and may modify and substitute some elements of the embodiments without departing from the spirits of this application. The scope of this application is limited by the appended claims.

What is claimed is:

1. A dehumidifier, comprising:

a machine body;

a housing, the machine body being located in the housing, and the housing including:

a back plate including an inner surface and an outer surface; the inner surface being a surface of the back plate proximate to an interior of the machine body, and the outer surface being a surface of the back plate away from the interior of the machine body; and a drainage hole located in the back plate and extending through the back plate along a thickness direction of the back plate;

a drainage pipe located in the housing; an end of the drainage pipe being communicated with the drainage hole; the drainage pipe including an extending portion, and the extending portion extending along a direction of the inner surface of the back plate towards the outer surface; and a sealing plug assembly including a sealing plug body and a connecting member; wherein the sealing plug assembly is configured to seal the drainage hole in a case where the dehumidifier does not require drainage, and the sealing plug body is disposed on the connecting member;

wherein the sealing plug body is detachably connected to the extending portion, and the sealing plug body includes:

a first annular structure;

a second annular structure; the first annular structure and the second annular structure being spaced apart along a radial direction of the sealing plug body; and a first cavity defined between the first annular structure and the second annular structure;

the first cavity being located at a side of the sealing plug body proximate to the machine body, and at least a portion of the extending portion being sealingly connected to the first cavity, wherein the first annular structure and the second annular structure are provided by the connecting member extending towards the machine body; and the first annular structure and the second annular structure are located at a side of the sealing plug body proximate to the machine body, and the first annular structure is located at an inner side of the second annular structure along a radial direction of the second annular structure.

2. The dehumidifier according to claim 1, wherein a length of the first annular structure in an axial direction of the sealing plug body is greater than a length of the second annular structure in the axial direction of the sealing plug body.

3. The dehumidifier according to claim 1, wherein the first annular structure includes at least one sealing rib located on a side wall of the first annular structure proximate to the second annular structure; the at least one sealing rib extends in a circumferential direction of the first annular structure, and abuts against an inner circumferential surface of the extending portion.

4. The dehumidifier according to claim 3, wherein the at least one sealing rib includes a plurality of sealing ribs, and the plurality of sealing ribs are disposed at intervals;

at least one of the plurality of sealing ribs includes a first inclined surface and a second inclined surface; wherein the first inclined surface is connected to the second inclined surface; the first inclined surface is located at a side of the second inclined surface proximate to the drainage pipe, and an absolute value of a slope of the first inclined surface is less than an absolute value of a slope of the second inclined surface.

5. The dehumidifier according to claim 1, wherein the second annular structure includes a first surface and a second surface;

the first surface is connected to the second surface; the first surface and the second surface are located at a surface of the second annular structure proximate to an axis of the sealing plug body, and the first surface is located at a side of the second surface away from the connecting member;

wherein the extending portion includes an outer circumferential surface, and the outer circumferential surface is a surface of the extending portion away from an axis of the extending portion;

the outer circumferential surface at least abuts against the second surface of the second annular structure.

6. The dehumidifier according to claim 5, wherein the first surface extends obliquely relative to the second surface in a direction away from the axis of the sealing plug body and proximate to the drainage pipe;

the second surface extends obliquely in the direction away from the axis of the sealing plug body and proximate to the drainage pipe;

an absolute value of a slope of the second surface is less than an absolute value of a slope of the first surface.

7. The dehumidifier according to claim 5, wherein the outer circumferential surface of the extending portion includes a first extending segment and a second extending segment; a first end of the second extending segment is connected to the first extending segment, and a second end of the second extending segment is communicated with the drainage hole;

the first extending segment extends obliquely in a direction from the extending portion towards the outer surface of the back plate and in a direction towards an axis of the drainage pipe; the second extending segment extends obliquely in the direction from the extending portion towards the outer surface of the back plate and in the direction towards the axis of the drainage pipe;

the second annular structure of the sealing plug body at least abuts against the first extending segment.

8. The dehumidifier according to claim 7, wherein an absolute value of a slope of the first extending segment is less than an absolute value of a slope of the second extending segment.

9. The dehumidifier according to claim 1, wherein the first annular structure is an elastic member, and the second annular structure is a plastic member.

10. The dehumidifier according to claim 1, wherein the housing further includes an opening located in the back plate;

the dehumidifier further comprises a fixing structure located on the inner surface of the housing;

the sealing plug body and the drainage pipe are detachably connected through the drainage hole; a first end of the connecting member is connected to the sealing plug body, and a second end of the connecting member is connected to the fixing structure through the opening.

11. The dehumidifier according to claim 10, wherein the opening extends through the back plate along the thickness direction of the back plate;

the housing further includes a shielding portion, and the shielding portion includes a second cavity;

an edge of the shielding portion is connected to the inner surface of the back plate, and the shielding portion is connected to at least one surface of the opening;

the second cavity of the shielding portion and the opening together define a first through hole, and the second end of the connecting member is connected to the fixing structure through the first through hole.

12. The dehumidifier according to claim 11, wherein the back plate connected to a side of the opening away from the fixing structure is recessed towards the machine body to provide the shielding portion;

a portion of the connecting member is accommodated in the shielding portion.

13. The dehumidifier according to claim 10, wherein a side of the opening proximate to the fixing structure is provided with a third inclined surface, and the third inclined surface extends obliquely in a direction from the inner surface of the back plate to the outer surface and away from the fixing structure.

14. The dehumidifier according to claim 10, wherein the fixing structure is a protrusion disposed on the inner surface of the back plate;

the second end of the connecting member is provided with a second through hole;

wherein the connecting member is connected to the fixing structure through the second through hole.

15. The dehumidifier according to claim 14, wherein the fixing structure includes:

a connecting segment, a first end of the connecting segment being connected to the inner surface of the back plate, and a second end of the connecting segment extending towards the machine body; the connecting segment being connected to the second through hole; and a limiting segment connected to the second end of the connecting segment; a maximum width of the limiting segment in a width direction of the back plate being greater than a maximum width of the connecting segment in the width direction of the back plate.

16. The dehumidifier according to claim 10, wherein a width of the connecting member at a portion corresponding to the fixing structure is greater than a width of a remaining portion of the connecting member.

17. The dehumidifier according to claim 10, wherein the connecting member includes a connecting member body and at least one first protruding rib;

wherein the first protruding rib is located at an end of the connecting member body proximate to the sealing plug body, and the first protruding rib is disposed at a side of the connecting member body away from the outer surface of the back plate.

18. The dehumidifier according to claim 10, wherein the connecting member includes a connecting member body and at least one second protruding rib;

wherein the second protruding rib is located at an end of the connecting member body away from the sealing plug body, and the second protruding rib is disposed at a side of the connecting member body away from the inner surface of the back plate.

19. The dehumidifier according to claim 10, wherein the drainage hole and the fixing structure are respectively located at both sides of the opening along a width direction of the back plate.

* * * * *